United States Patent [19]

Nelson et al.

[11] 4,372,376

[45] Feb. 8, 1983

[54] HEAT PUMP APPARATUS

[75] Inventors: Paul A. Nelson, Wheaton; Jeffrey S. Horowitz, Woodridge, both of Ill.

[73] Assignee: The United States of America as represented by the United States Department of Energy, Washington, D.C.

[21] Appl. No.: 214,807

[22] Filed: Dec. 9, 1980

[51] Int. Cl.³ .............................................. F28D 15/00
[52] U.S. Cl. ............................... 165/104.12; 165/48 S
[58] Field of Search ..................... 165/104.12, DIG. 17

[56] References Cited

U.S. PATENT DOCUMENTS 3,943,719 3/1976 Terry et al.
4,055,962 11/1977 Terry.

OTHER PUBLICATIONS

"The Metal Hydride Chemical Heat Pump," J. M. Clinch, et al., Proc. of the DOE Chemical Energy Storage and Hydrogen Energy Systems Contracts Review, Feb. 1980.

"The Thermodynamic Analysis of a Metal Hydride Heat Pump," H. Abelson and J. S. Horowitz, Presented at the Intersociety Energy Conversion Engineering Conference Public Meeting Held Aug. 1980 in Seattle, Wash. The Proceedings for that Conference have or will be Published in the AIAA Journal of Energy, Jul.-Aug. 1981.

"Engineering Development of a Metal Hydride Heat Pump," J. S. Horowitz et al., Presented at the Second International Conference on Alternative Energy, Miami, Florida, Dec. 10-13, 1979, and Printed in the Proc. of the Sec. Intl. Conf. on Alternative Energy Sources in Dec. 1980.

Primary Examiner—Albert W. Davis, Jr.

[57] ABSTRACT

A heat pump apparatus including a compact arrangement of individual tubular reactors containing hydride-dehydride beds in opposite end sections, each pair of beds in each reactor being operable by sequential and coordinated treatment with a plurality of heat transfer fluids in a plurality of processing stages, and first and second valves located adjacent the reactor end sections with rotatable members having multiple ports and associated portions for separating the hydride beds at each of the end sections into groups and for simultaneously directing a plurality of heat transfer fluids to the different groups. As heat is being generated by a group of beds, others are being regenerated so that heat is continuously available for space heating. As each of the processing stages is completed for a hydride bed or group of beds, each valve member is rotated causing the heat transfer fluid for the heat processing stage to be directed to that bed or group of beds. Each of the end sections are arranged to form a closed perimeter and the valve member may be rotated repeatedly about the perimeter to provide a continuous operation. Both valves are driven by a common motor to provide a coordinated treatment of beds in the same reactors. The heat pump apparatus is particularly suitable for the utilization of thermal energy supplied by solar collectors and concentrators but may be used with any source of heat, including a source of low-grade heat.

8 Claims, 9 Drawing Figures

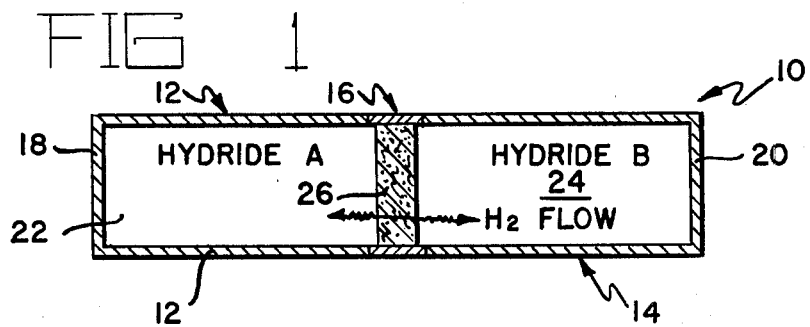
FIG 1
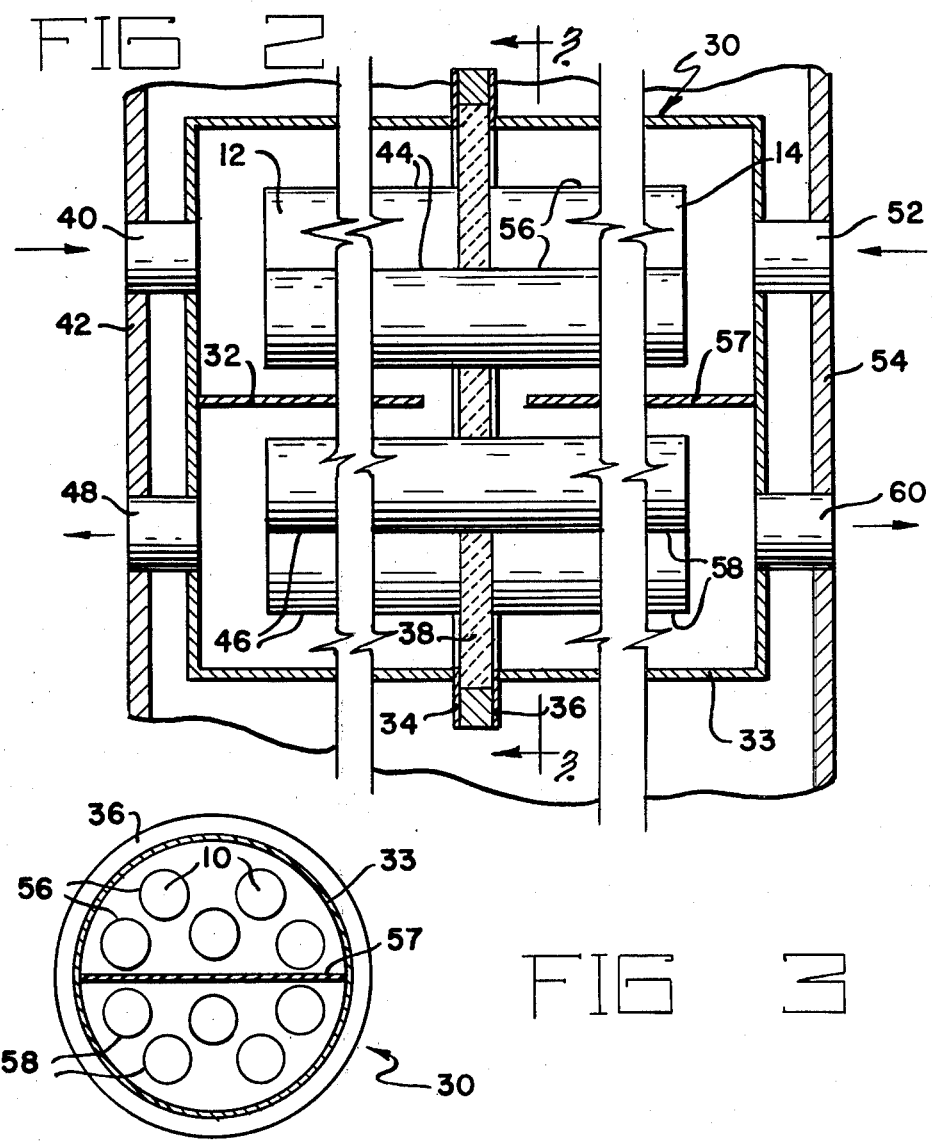
FIG 2
FIG 3

HEAT PUMP APPARATUS

CONTRACTUAL ORIGIN OF THE INVENTION

The U.S. Government has rights in this invention pursuant to Contract No. W-31-109-ENG-38 between the U.S. Dept. of Energy and Argonne National Laboratory.

BACKGROUND OF THE INVENTION

This invention relates to an apparatus for utilizing thermal energy for heating and cooling and more particularly to an apparatus with a plurality of individual heat pumps or reactors with multiple reactor beds and operable by sequential processing with heat transfer fluids in a plurality of processing stages and including means for simultaneously directing a plurality of the heat transfer fluids to selected groups of the reactor beds to carry out the individual processing stages with respect to each of the groups.

Heat pumps normally operate to transfer heat from a cold body to a hot body with the expenditure of energy. In the winter, heat is pumped from cold outside air into a house for space heating. In the summer, the process is reversed and heat is pumped from the air inside the house to the outside to provide space cooling.

Many heat pump systems in use require electricity as a source of energy to drive compressor units. In view of the cost of electricity and efforts at energy conservation, other heat pump systems which operate with little or no electrical input are under development.

One system of current interest involves the use of hydrogen gas in a hydride-dehydride (or hydridable material) cycle to transfer heat from one zone to another. In one portion of the cycle, heat at a high temperature is used to decompose a high temperature hydride in a reactor bed in one vessel to generate hydrogen gas to flow to a hydridable material in a separate vessel and form a low temperature hydride with the release of heat. The reactor beds are then cooled to provide conditions under which the reverse flow of hydrogen may occur. In the reverse portion of the cycle normally characterizing a heat pump operation, the low temperature hydride is decomposed using heat from a low temperature source such as outside air to generate hydrogen gas which flows to the cooled high temperature hydride reactor (composed of hydridable material). During formation of the high temperature hydride, additional heat is released at a higher temperature. The two reactors are then heated to their original temperatures to complete the cycle. This system, including variations, is disclosed in copending application Ser. No. 000,741, filed Jan. 3, 1979 now U.S. Pat. No. 4,262,739, issued Apr. 21, 1981 and titled "System for Thermal Energy Storage, Space Heating and Cooling and Power Conversion." U.S. Pat. Nos. 3,943,719 and 4,055,962 further disclose details of hydride heat pump systems utilizing the hydride-dehydride cycle.

These hydride heat pump systems have in general been designed with several separate one-bed reactors interconnected by piping and a multiplicity of valves through which hydrogen gas flows between pairs of beds. In addition, piping systems and valves are also required to direct heat transfer fluid to the various beds during each of the processing stages in the cycle. One of the problems with a system of this type is that the overall efficiency of operation is reduced by the arrangement of the separate beds and the extent of the associated piping and valves. Another problem is that the operation of the system is complex and requires extensive piping and number of valves regarding both the hydrogen portion and the heat transfer portions of the system. A further problem is that a leak of hydrogen in one part of the system requires a shutdown of other beds in the system.

One partial solution to these problems has been the development of an individual heat pump or reactor in which a tube with closed ends contains a pair of different hydrides at opposite end sections forming hydride beds. A filter is positioned intermediate the ends of the tube to prevent mixing of the hydrides while permitting flow of hydrogen gas between the beds. While this individual heat pump or reactor has the advantage that each reactor is isolated from the others, it is necessary that a system utilizing these reactors be developed.

One object of this invention is a system utilizing a plurality of individual hydride-dehydride reactors in a compact arrangement. Another object is a simplified arrangement of reactors with a reduction in the amount of piping and valves. A further object is an arrangement in which the various processing stages may be carried out simultaneously so that heat is recovered from some reactor beds while others are being regenerated. An additional object is an arrangement in which the processing stages may be carried out continuously so that as each stage in the processing is completed with respect to a reactor bed or reactor beds, heat transfer fluid for the next processing stage is directed to that bed or beds. Yet another object is an arrangement in which the cycle of operation may be repeated. Additional objects, advantages and novel features of the invention will be set forth in part in the description which follows, and in part will become apparent to those skilled in the art upon examination of the following or may be learned by practice of the invention.

SUMMARY

We have invented an apparatus in which a plurality of reactor beds are arranged in a pattern and in which valve means is operated to direct a plurality of streams of heat transfer fluid to selected groups of beds so that a plurality of processing stages are carried out simultaneously. Advantageously, the valve means includes a member movable along a path with respect to the pattern of reactor beds so that as one processing stage is completed with respect to one group of reactor beds, the member is moved and processing fluid for the next stage is directed to that group of reactor beds. At any position along the path, selected group of reactors are effectively isolated by the valve means and heat transfer fluid is directed to each group of reactor beds. Movement of the member along the entire path provides all of the processing stages in a sequential manner for each reactor bed. In one embodiment, the reactors are provided by a plurality of tubes with two different hydrides in the opposite end sections of each tube. A common divider is provided so that the common end sections and associated beds may be treated by processing fluid separate from the other end sections and associated beds. Advantageously, the valve means includes a pair of valve mechanisms, each positioned adjacent each of the end sections and operated from a common driving means to provide separate by coordinated processing of the beds at each end of the reactors. Advantageously, the reactor beds are arranged with their common end sections forming closed perimeters such as a circle so that the cycle of processing stages may be carried out on a repeated basis by continued rotation of the movable member to provide continuous operation of the apparatus.

As used herein, the word "hydride" or phrase "hydridable material" are interchangeable since the particular hydrogen to metal ratio of the material present in each hydride bed will depend upon the particular point in the hydride-dehydride cycle being described.

BRIEF DESCRIPTION OF THE DRAWINGS

In the drawings:

FIG. 1 is a sectional view of an individual tube serving as a reactor and containing high and low temperature hydrides as two separated reactor beds.

FIG. 2 is a sectional side view of a tube bundle, shown in an end sectional view in FIG. 3, with upper and lower tubes of the type shown in FIG. 1.

FIG. 3 is a sectional view taken along line 3—3 of FIG. 2 and showing a plurality of tubes of the type shown in FIG. 1 forming a tube bundle.

DETAILED DESCRIPTION OF THE INVENTION

Figure 4:
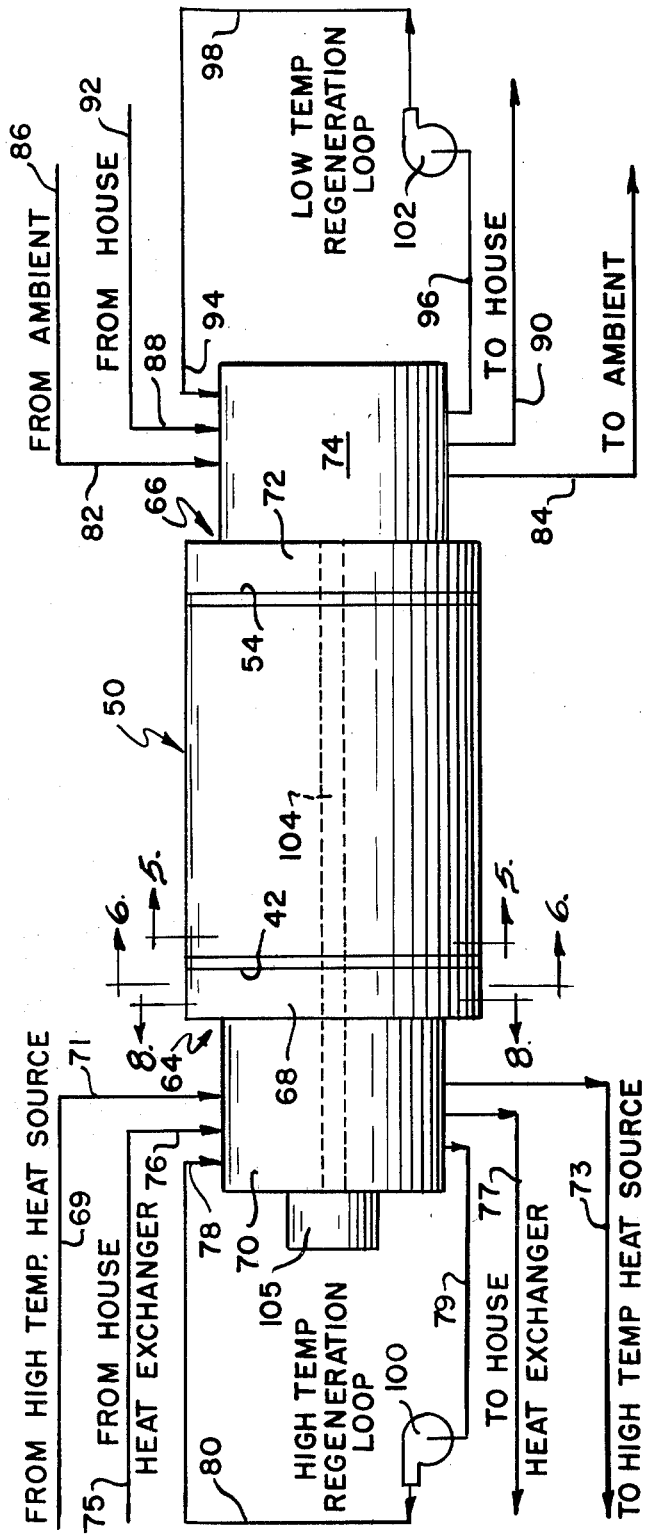
FIG. 4 is a side view in schematic form of one embodiment of the apparatus of this invention.

The heat pump apparatus of the invention includes a plurality of individual reactors and preferably two bed reactors with individual hydride beds within first and second end sections 12 and 14 of tube 10 as illustrated in FIG. 1. Suitable materials for the tubular sections 12 and 14 include stainless steel and aluminum for effective transfer to the hydrides, while intermediate section 16 is constructed of insulating material such as an epoxy resin to limit heat transfer longitudinally along tube 10 between end sections 12 and 14. End sections 12 and 14 include closed ends 18 and 20 to thereby form an individual reactor system with a pair of reactor beds. As illustrated, end section 12 contains a high temperature hydride 22 while end section 14 contains a low temperature hydride 24. The hydrides in these beds may be in the form of powder preferably retained in an open cell aluminum foam or may be in pellet form. A preferred construction of tube 10 is one designed by International Nickel Company in which each bed includes about six hydride capsules within a tube whose typical dimensions are about 0.625 inches in diameter and about 4 feet long. Particularly when the hydrides are in powder or other form where some mixing might occur during movement of the hydrogen gas between the beds, a barrier 26 of stainless steel or aluminum is present in section 16 to prevent mixing of the hydrides while permitting passage of the hydrogen gas in either direction under a pressure gradient.

The choice of hydrides which may be used will depend primarily upon the temperature which is available from the source of thermal energy to decompose hydride 22. Thus, for space heating and cooling purposes, hydride 22 must be capable of decomposing at the temperature available from the source of thermal energy with sufficient pressure to react with hydride 24 (in the form of a hydridable material) exothermically to produce a temperature adequate for space heating purposes, and whose hydrogen decomposition pressure at the space heating temperature is lower than the decomposition pressure of the second hydride at the lower temperature available from the outside ambient environment for providing the heat of decomposition. For example, temperatures available from present solar energy collectors may range from about 210° to 300° F. (approximately 100°–150° C.), while higher temperatures may be available from other sources. An exothermic reaction temperature of from about 100° to 140° F. (approximately 40°–60° C.) is sufficient for space heating purposes while about 32° to −20° F. (approximately 0° to −10° C.) outside ambient temperatures are generally available for supplying heat of decomposition and which will also determine the refrigeration temperature available for space cooling. Preferable combinations of hydrides 22 and 24 include $CaNi_5H_4$ and $LaNi_5H_6$, and $LaNi_{4.575}Al_{0.425}H_6$ and $LaNi_5H_6$, respectively. $CaNi_5H_4$ decomposes at 130° C. generating about 12 atmospheres pressure while hydrogen combines with $LaNi_5$ at 50° C. and 7 atmospheres $LaNi_5H_6$ will then decompose at 10° C. at 1 atmosphere while the hydrogen reforms $CaNi_5H_4$ at 50° C. and 0.5 atmosphere.

In the operation of tubes 10 as heat pumps, it is necessary that the reactor beds be subjected to a plurality of processing stages using heat transfer fluids as processing fluids. Explanation of the operation of each of the stages is provided below as an aid in further understanding of the operation of the apparatus of the invention. In the first stage, a source of high temperature heat (from a solar collector) at a typical temperature of 220° F. is applied to end section 12 causing hydride 22 to decompose and generate hydrogen gas which flows to the second end section 14 and the second hydride 24. The low temperature hydride 24 is formed with a release of heat which is removed by a stream of heat transfer fluid at a temperature of about 110° F. for space heating. The next or second processing stage includes cooling of both hydride beds 22 and 24 with heat transfer fluids at temperatures of about 120° F. (contacting end section 12) and −20° F. (contacting end section 14), respectively, in order that the desired reverse pressure gradient may be generated by outside air. In the third stage, a heat-transfer fluid at a temperature of about −20° F. from a source of outside air is contacted with end section 14 to generate hydrogen gas from hydride 24 which flows to end section 12 to form hydride 22 and release heat to a heat transfer fluid at a temperature of about 110° F. which is also used for space heating. In the fourth stage involving a heating step, hydrides 22 and 24 are separately heated by heat transfer fluids to raise the hydrides to their original temperatures. As described above, each of the hydride beds in each reactor is subjected to a plurality of processing stages which may be different or the same for each pair of beds in a reactor. As an illustration, the application of heat for decomposition of hydride 22 at end section 12 is carried out simultaneously with the removal of heat of reaction associated with the formation of hydride 24 at end section 14. Both beds are then cooled although to different temperatures. The reverse of the initial heating stage occurs in the third stage for end section 12 during which hydride 24 is being heated to decompose while heat of reaction associated with the formation of hydride 22 is being removed.

As illustrated in FIGS. 2-3, a plurality of tubes 10 are combined to form a tube bundle 30. Five upper tubes are separated from the lower five tubes by baffle 32 and are contained within a cylindrical frame 33 constructed of a metal such as aluminum. Tube sheets 34 and 36 for supporting the tubes and together with insulator 38 form a divider between tube end sections 12 and 14 for isolating end sections 12 from end sections 14 to permit separate treatment of the hydride beds 22 and 24 by the processing fluids. As illustrated, the construction of bundle 30 permits heat transfer fluid 40 to be directed separately to each bank of end sections 12 and 14 during the primary and reverse heating stages (first and third stages) when each end section is heated to decompose the associated hydride and cause hydrogen gas to flow to the other end section. For end sections 12, a heat transfer fluid such as an ethylene glycol-water solution is directed through pipe 40 on face 42 of bundle 30 and over the external surfaces 44 of end sections 12 of the upper five tubes; is reversed in direction by baffle 32 to flow over the external surfaces 46 of end sections 12 of the lower five tubes; and exits through pipe 48 on face 42.

In a similar manner, a second heat transfer fluid which also may be an ethylene glycol-water solution is directed to end sections 14 of the upper five tubes by pipe 52 on face 54 and flows over the external surfaces 56 of those tubes, is reversed in direction by baffle 57 to flow over the external surfaces 58 of end sections 14 of the lower five tubes, and exits through pipe 60 on face 54.

Figure 5:
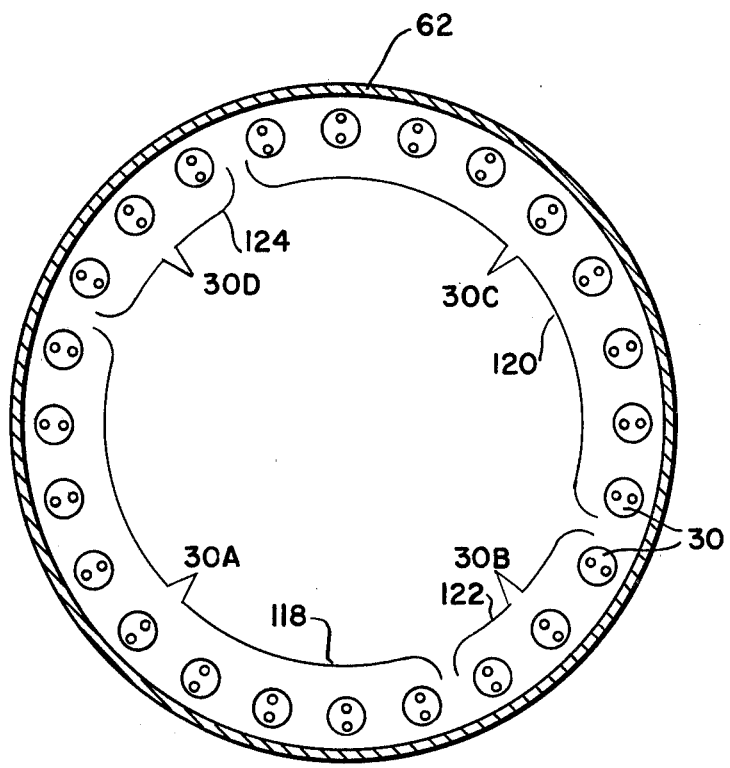
FIG. 5 is a sectional view taken along line 5—5 of FIG. 4 showing a pattern of tube bundles arranged in and supported by a housing.

A plurality of tubes 10 as reactors are arranged in twenty-four bundles in compact pattern 62 and supported by housing 50 as illustrated in FIGS. 4-5. Housing 50 is constructed of a metal such as aluminum. Preferably the reactors are arranged with each of the common end sections forming closed perimeters permitting the valve mechanism (as described below) to operate by repeated movements in the same direction over the perimeter thereby extending the time of operation of the apparatus with a limited number of reactors. Preferably, tubular end sections 12 and 14 are arranged so that the common ends each form a pattern of a closed perimeter in circular form. Adjacent faces 42 and 54 are positioned first and second valve mechanisms 64 and 66 with movable and stationary members 68 and 70 for valve 64 and movable and stationary members 72 and 74 for valve 66. Through valve mechanism 64, a plurality of streams of heat transfer fluid are directed to and removed from end sections 12 and associated hydride beds 22. By valve mechanism 66, an additional plurality of streams of heat transfer fluid are directed to and removed from end sections 14 and associated beds 24.

As discussed below with respect to FIG. 6, movable members 68 and 72 when moved provide a change in selection of tube bundles for each processing stage so that each bundle is subjected to a complete cycle of treatment.

As illustrated schematically in FIG. 4, three streams of heat transfer fluid are circulated through valve 64 and end sections 12 with three additional streams being circulated through valve 66 and end sections 14. Heat transfer fluid 69 from a solar heating unit (not shown) is introduced and removed by inlet and exit lines 71 and 73. For the same reactors but at end sections 14, heat transfer fluid 92 is introduced and removed by inlet and exit lines 88 and 90 to remove heat generated by formation of hydride 24 to provide heat for space heating (not shown). For end sections 12, the second stream of heat transfer fluid 75 is circulated by lines 76 and 77 through valve 64 to a different group of reactors to remove heat formed during the reverse heating stage of hydrides 24 and formation of hydrides 22. The heat generated is removed by exit line 77 for heating the same space. At valve 66, the heat transfer fluid 86 providing heat to decompose hydride beds 24 at a cooled temperature is introduced and removed by inlet and exit lines 82 and 84. In the remaining pair of lines 78 and 79 for valve 64, heat transfer fluid is introduced and removed for cooling one group of reactors and heating a second group of reactors for the second and fourth processing stages. For the same purpose, heat transfer fluid 98 is introduced and removed from valve 66 by inlet and exit lines 94 and 96.

Pumps 100 and 102 provide a driving force for circulating the heat transfer fluids in the high and low temperature regeneration loops. As illustrated, motor 105 is positioned adjacent valve mechanism 64 for driving the movable members of valve mechanisms 64 and 66 as described below.

In general, selection of the number of tube bundles to be treated in each stage of the regeneration process (stages two and four) will influence the determination of the bundles to be subjected to the heat addition stage during which a hydride 22 is decomposed and the reverse. Three bundles were selected to be cooled with three additional bundles to be heated. Calculations show that roughly three times the heat transferred during cooling or heating is transferred during the hydride decomposition or formation stages. Therefore, nine tube bundles were selected for each of those stages resulting in a total of twenty-four bundles.

FIG. 5 further serves to illustrate the bundles 30 in each stage of the operation of the apparatus. In this embodiment, each bundle is sequentially treated during the four stages of treatment (as described above) in a complete cycle. As illustrated in FIG. 5 with respect to end sections 12 and hydride beds 22, the reactor beds are divided into groups for individual treatment by a processing fluid in one of the stages. Nine of bundles 30 are shown as bundles 30A (group 118) for the primary heating stage with three bundles 30B (group 122) for the regenerative cooling, nine bundles 30C (group 120) for the regenerative heating and three bundles 30D (group 124) for the heating stage by which heat is removed for space heating.

In the operation of the apparatus of this invention, the reactors as illustrated by tubes 10 are separated into a plurality of groups with each group being subjected to treatment by a heat transfer fluid in one of a plurality of processing stages. Valve means are provided with a plurality of compartment means for isolating the groups of reactor beds and with multiple ports for directing a plurality of streams of heat transfer fluids to the different groups for carrying out each processing stage and collectively and simultaneously carrying out a plurality of processing stages. The valve means includes a member movable along a path with respect to the pattern of reactor beds for changing the selection of reactor beds in each group for treatment in each processing stage. As the member is moved, all or a portion of the reactor beds previously subjected to the first processing stage (heat for hydride decomposition) are subjected to the second of the processing stages (cooling to a lower temperature). As illustrated in FIGS. 4, 6 and 7, the valve means are positioned adjacent at least one of the end sections and preferably both end sections 12 and 14 of tubes 10. Advantageously, both valve mechanisms include movable members driven by a common motor means to provide a coordinated combination of processing stages for reactor beds 22 and 24.

Figure 6:
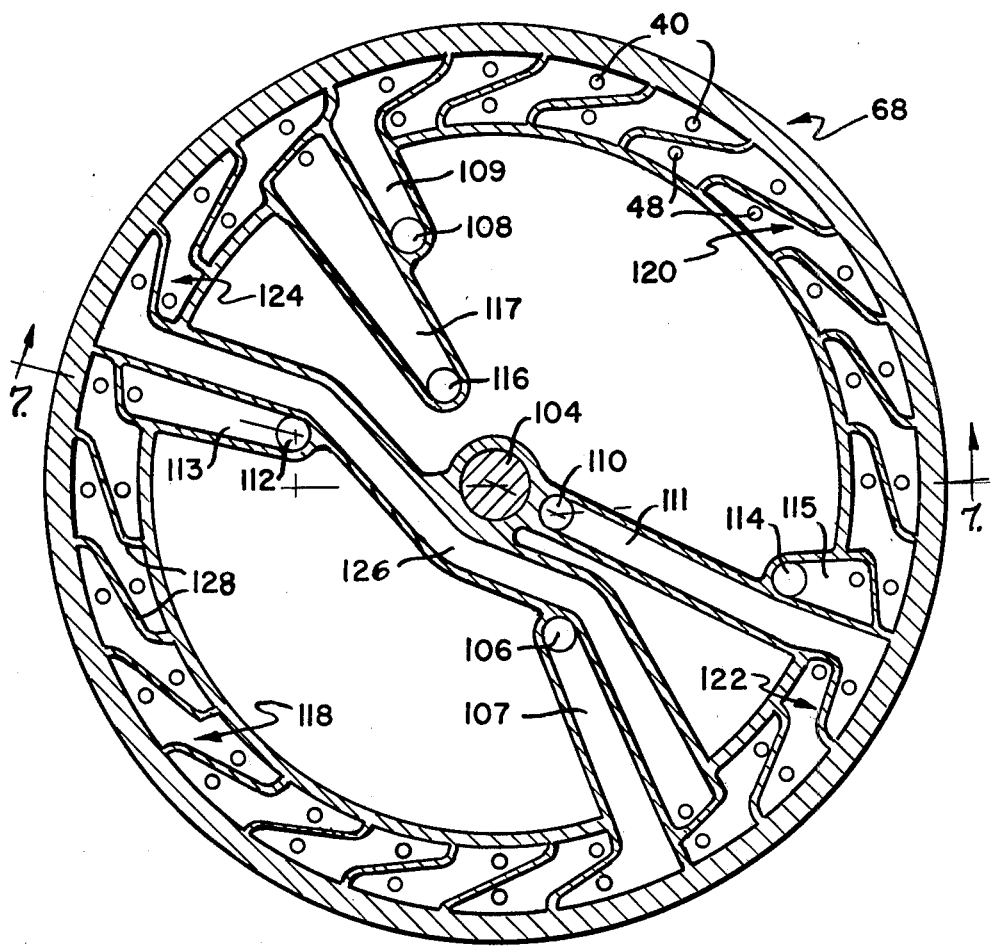
FIG. 6 is a view of the movable valve member taken along line 6—6 of FIG. 4.
Figure 7:
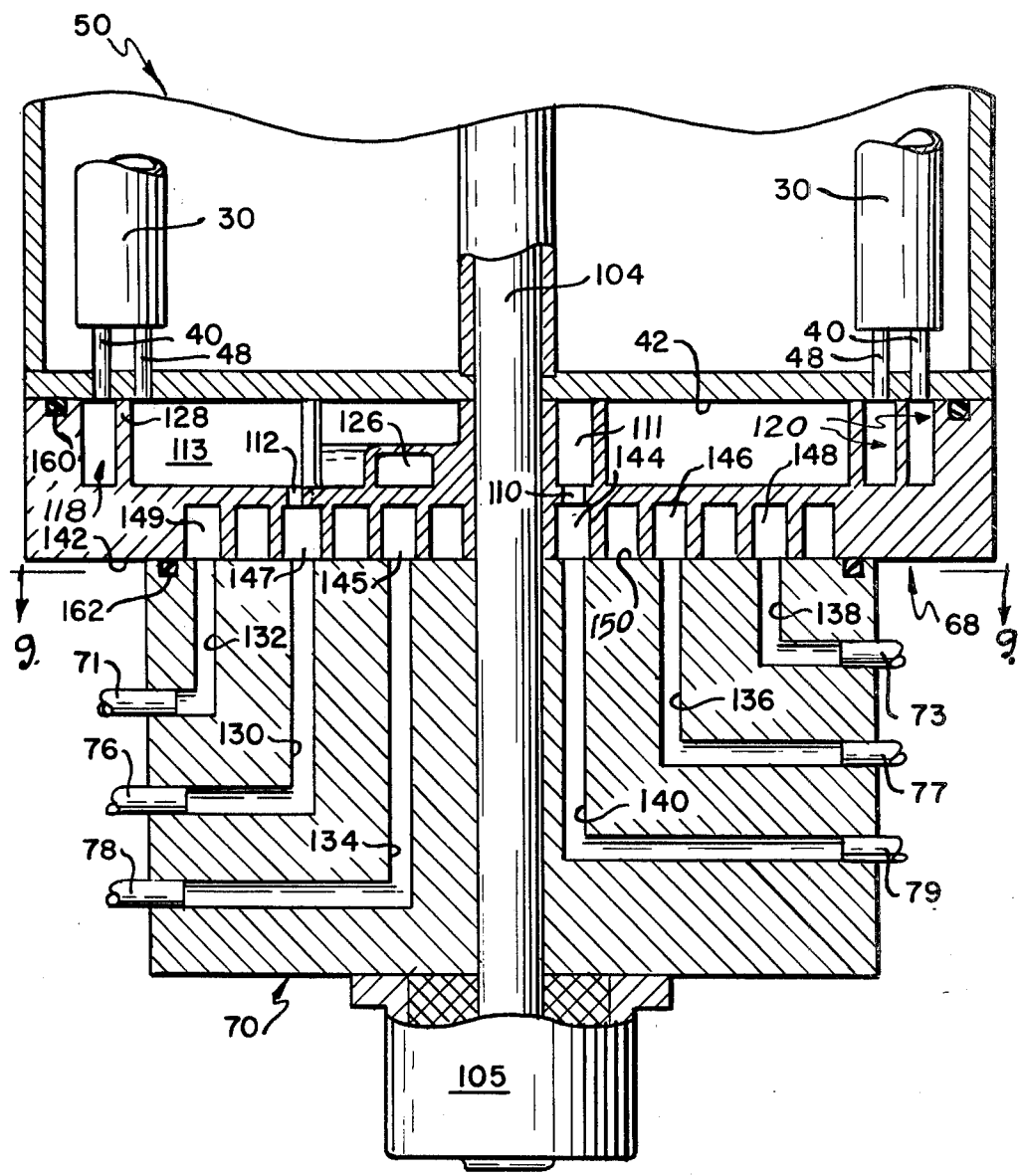
FIG. 7 is a sectional view of the movable and stationary valve members taken along line 7—7 of FIG. 6 and a side view of the motor for driving the movable valve members.

Further details of valve 64 with movable and fixed members 68 and 70 are illustrated in FIGS. 6 and 7. Valve 66 is constructed the same although different processing fluids are directed to the different groups of reactor beds as described herein. Valves 64 and 66 are constructed of a metal such as aluminum. For valve 64, movable member 68 is advantageously of one piece construction for isolating groups of tube bundles 30 for treatment by streams of heat transfer fluid introduced through inlet ports 106, 108 and 110 and removed through exit ports 112, 114 and 116. FIG. 6 includes the ends of the tube bundles 30 as groups 118, 120, 122 and 124 as shown in FIG. 5. Passageways 107, 109 and 111 direct the flow to the inlet pipes 40 of the particular tube bundles. As illustrated, the high temperature fluid is introduced by port 106, flows through passageway 107 to each of nine tube bundles of group 118 and is removed through passageway 113 and exit port 112. The compartment formed by passageways 107 and 113 and the adjacent perimeter section of member 68 represents one of the plurality of compartments formed by similar portions of member 68 for isolating the various groups of reactor beds. In a similar manner, the flow of heat transfer fluid for removing heat generated during the regeneration of the high temperature hydride is introduced through port 108, flows through passageway 109 to each of nine tube bundles of group 120 and is removed through passageway 115 and exit port 114. Heat transfer fluid used for cooling and heating separate groups 122 and 124 of three tube bundles is introduced through inlet port 110, flows through passageway 111 to group 120 of three tube bundles and is then directed through interconnecting passageway 126, to the second group 124 of three tube bundles. Removal of the stream is through passageway 117 and exit port 116. Baffles 128 serve to isolate the inlet and outlet connections to the indicated tube bundles. As member 68 is rotated on shaft 104, the particular tube bundles subject to each processing stage will change. As illustrated in FIG. 7, movable member 68 is interconnected to the three incoming and exiting streams of heat transfer fluid by stationary member 70 which is constructed with connecting inlet passages 130, 132 and 134 and exit passages 136, 138 and 140.

Figure 8:
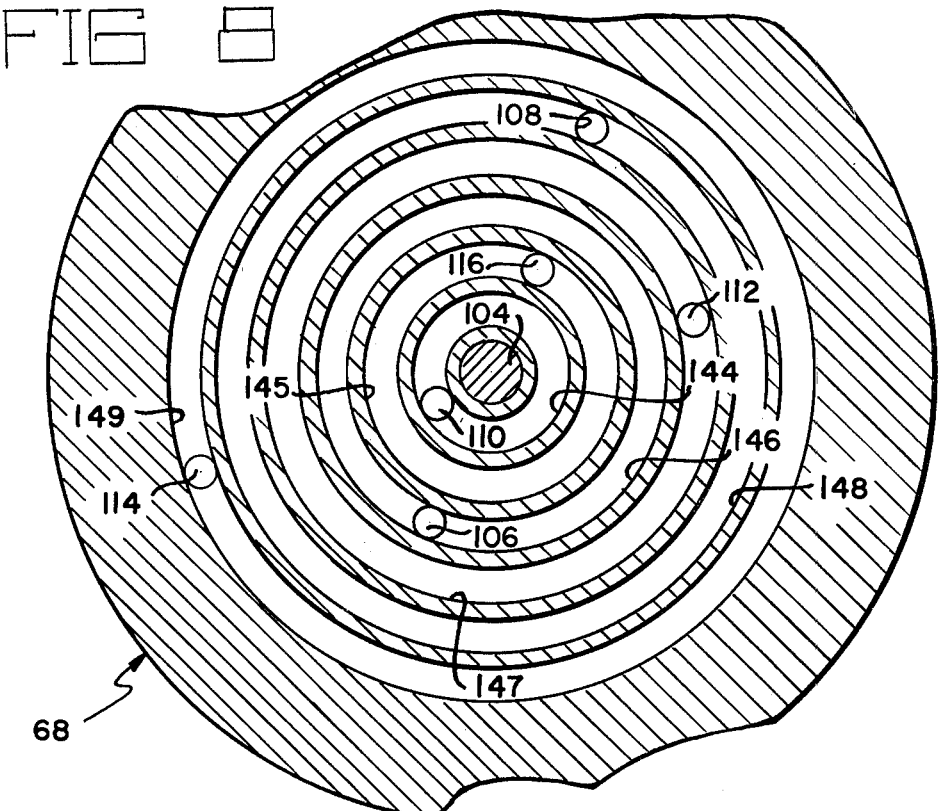
FIG. 8 is a view of the movable valve member taken along line 8—8 of FIG. 4 and showing a pattern of concentric channels facing the stationary member.
Figure 9:
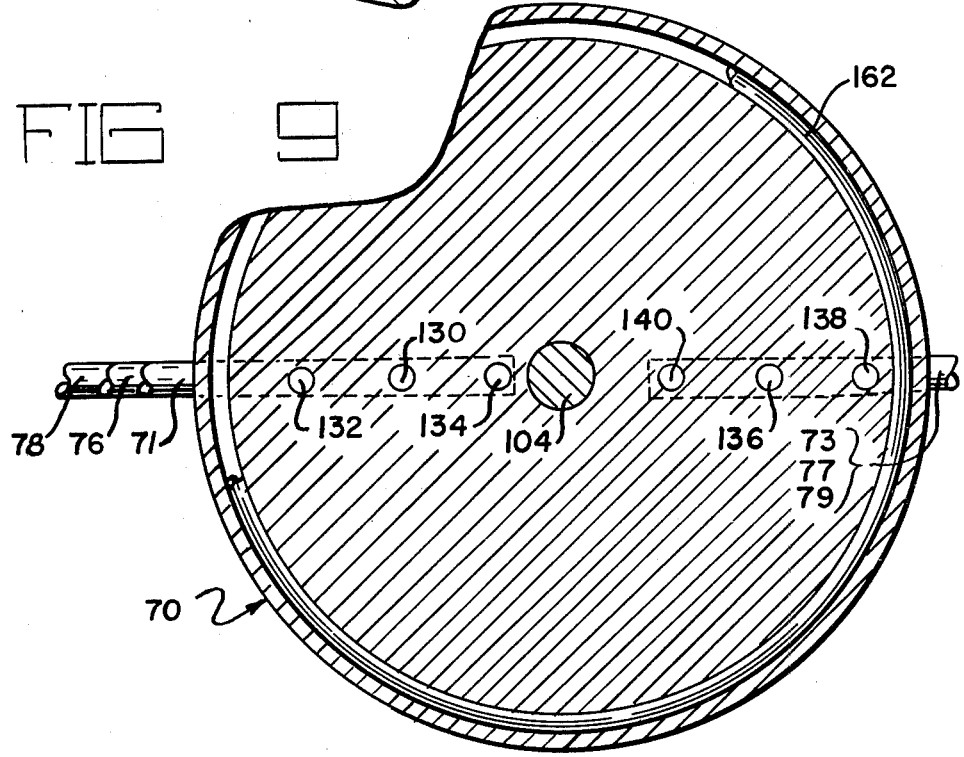
FIG. 9 is a sectional view of the stationary valve member taken along line 9—9 of FIG. 7 showing the arrangement of fluid passages facing the pattern of concentric channels of the movable valve member as shown in FIG. 8.

Valve 64 is constructed with means for providing a continuous connection between each of the inlet and exit streams during each rotation completing each cycle and during continuous rotations of member 68. Advantageously, movable member 68 is constructed with a plurality of channel means preferably in a concentric arrangement with each channel means being located to provide continuous connection with an adjacent passage in the stationary member 70. As member 68 is rotated, each of the channel means provides continuous connection with the adjacent passage. In a preferred embodiment as illustrated by FIGS. 7, 8 and 9, movable member 68 includes face 142 adjacent stationary member 70 with six open-sided concentric channels 144, 145, 146, 147, 148 and 149 to provide continuous connection with passages 130-140 of fixed member 70 during rotation of member 68. Sealing means as illustrated by "O" rings 160 and 162 are provided to provide effective seals between the adjacent faces 142 and 150 of the movable and stationary members and between members 68 and face 42 of housing 50.

In FIG. 9, face 150 of fixed member 70 is illustrated with passageways 130-140 positioned to match the positions of channels 144-149. As member 68 is rotated, concentric channels 144-149 provide continuous connections between passages 130-140 and ports 106, 108, 110, 112, 114 and 116.

In the designed operation of the described embodiment of the invention, valves 64 and 66 are rotated to complete one cycle in about 4 minutes. With a weight of hydride 22 ($LaNi_{4.575}Al_{0.425}$) of about 100 lb. and of hydride 24 ($LaNi_5$) being about 80 lb., an output of 50,000 BTU/Hr. is obtained with a coefficient of performance of about 1.5.

The apparatus of this invention provides several advantages in its operation. A compact arrangement of individual reactors and reactor beds is provided without the lengthy piping and number of valves of prior systems. Each reactor is isolated with respect to hydrogen flow and therefore a leak in one reactor does not require a shutdown of all reactors. The reactors are arranged with common end sections containing the same hydride beds so that processing fluid may be directed to one or more beds for one processing stage. Valve means are provided which by mechanical design provides isolation of different groups of reactor beds without a large number of individual hand or automatic operated valves. Valve mechanisms are provided at each end section of the reactors to provide separate but coordinated treatment of the different hydride beds. A plurality of processing stages is carried out simultaneously with respect to the groups of reactor beds so that as the heat is generated by some, others are being regenerated, permitting continuous operation of the apparatus. In addition, the absence of extensive piping and associated equipment and the arrangement of flows between the cooling and heating stages (stages 2 and 4) results in increased efficiencies of operation.

The foregoing description of a preferred embodiment of the invention has been presented for purposes of illustration and description. It is not intended to be exhaustive or to limit the invention to the precise form disclosed, and obviously many modifications and variations are possible in light of the above teaching.

The embodiments of the invention in which an exclusive property or privilege is claimed are defined as follows:

1. A heat pump apparatus comprising:
   a housing
   a plurality of metal hydride reactor beds supported by the housing with at least a portion of said beds being arranged in a pattern, each of the beds being operable by sequential treatment with a plurality of heat transfer fluids in a plurality of processing stages; and
   valve means positioned adjacent said pattern of beds and including means for separating said beds of said pattern into groups, each group for individual treatment in one of said processing stages, and means for simultaneously directing a plurality of said heat transfer fluids to said groups of beds so that a plurality of said processing stages are carried out simultaneously.

2. The apparatus of claim 1 wherein said valve means includes at least one member movable with respect to said pattern of beds for changing the selection of beds in each of said groups.

3. The apparatus of claim 2 wherein said member includes a plurality of compartments for separating said beds into said groups and a plurality of ports for directing the plurality of heat transfer fluids.

4. The apparatus of claim 2 wherein said pattern forms a closed perimeter, movement about said perimeter providing one cycle of operation, and wherein said member is movable about said perimeter for more than one cycle for providing continuous operation of said apparatus.

5. The apparatus of claim 4 wherein said reactors include a plurality of individual tubes with first and second end sections containing high and low temperature hydrides, respectively, at least one of said end sections arranged in said closed perimeter pattern.

6. The apparatus of claim 5 wherein said valve means includes a stationary member connected to a plurality of sources of heat transfer fluid and wherein one of said movable and stationary members includes a plurality of concentric channels for providing continuous connection with said sources during movement of said member.

7. The apparatus of claim 5 wherein said valve means includes first and second valve mechanisms positioned adjacent said first and second end sections, respectively, and said housing includes means dividing said first and second end sections for individual treatment.

8. The apparatus of claim 7 including driving means for moving said first and second valve mechanisms in a coordinated movement.

* * * * *